W. C. COOPER.
VALENCY CHART.
APPLICATION FILED JULY 15, 1918.

1,308,167.

Patented July 1, 1919.
3 SHEETS—SHEET 1.

Fig. 1

W. C. COOPER.
VALENCY CHART.
APPLICATION FILED JULY 15, 1918.

1,308,167.

Patented July 1, 1919.
3 SHEETS—SHEET 2.

W. C. COOPER.
VALENCY CHART.
APPLICATION FILED JULY 15, 1918.
1,308,167.
Patented July 1, 1919.
3 SHEETS—SHEET 3.
Fig. 3
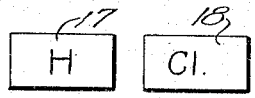
H Cl or Hydrochloric Acid
Fig. 4
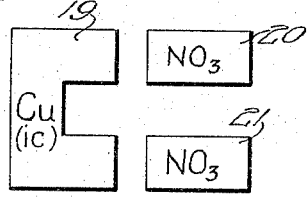
$Cu(NO_3)_2$ or Cupric Nitrate
Fig. 5
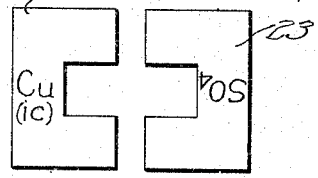
$CuSO_4$ or Cupric Sulphate
Fig. 6
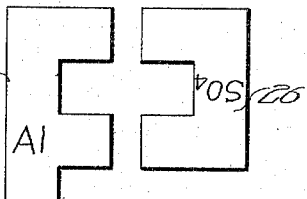
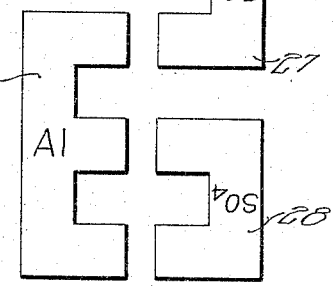
$Al_2(SO_4)_3$ or Aluminum Sulphate
Witnesses:
Arthur W. Carlson
Robert F. Weir
Inventor
William C. Cooper
By Arthur L. Durand
Atty.

UNITED STATES PATENT OFFICE.

WILLIAM C. COOPER, OF CHICAGO, ILLINOIS, ASSIGNOR OF ONE-HALF TO J. COURTLAND COOPER, OF CHICAGO, ILLINOIS.

VALENCY-CHART.

1,308,167.      Specification of Letters Patent.      Patented July 1, 1919.

Application filed July 15, 1918. Serial No. 244,933.

*To all whom it may concern:*

Be it known that I, WILLIAM C. COOPER, a citizen of the United States of America, and resident of Chicago, Illinois, have invented a certain new and useful Improvement in Valency-Charts, of which the following is a specification.

This invention relates to devices for teaching chemistry, and more particularly to devices for illustrating the theory of valency, so that the student may visualize, so to speak, the practical application of valency in the combining of different chemical elements.

The object of the invention is, therefore, to provide a simple and inexpensive valency chart, preferably in the form of a blank printed on sheet material, with the different sections representing the different elements or radicals outlined thereon, and with the indicia of the different elements or radicals also permanently printed on each section, whereby the different sections can be cut out to form different shapes, with each section provided with one or more separate arms representing the valence of the element or radical which it represents, so that the monovalent elements will have but one arm, being represented by a section in the form of a straight strip, while the divalent elements will be represented by sections having two arms, and the trivalent by sections having three arms, etc., the elements having a greater valence being represented by sections having a greater number of arms, and the said arms being of uniform size and uniformly spaced apart, so that when printed in blank form on the sheet, the different sections will interlock, thus eliminating waste between the sections when they are cut out of a sheet, and whereby, in illustrating different combinations of elements or radicals, the sections can be placed so that their arms are end to end to illustrate the way in which one element or radical combines with another, and in accordance with any known chemical formula to produce the desired result.

It is also an object to provide certain details and features and combinations tending to increase the general efficiency and desirability of a valency chart of this particular character.

To these and other useful ends the invention consists in matters hereafter set forth and claimed, and shown in the accompanying drawings, in which—

Figure 1 is a plan view of the right hand end-portion of the blank forming a valency chart embodying the principles of the invention.

Figure 2:
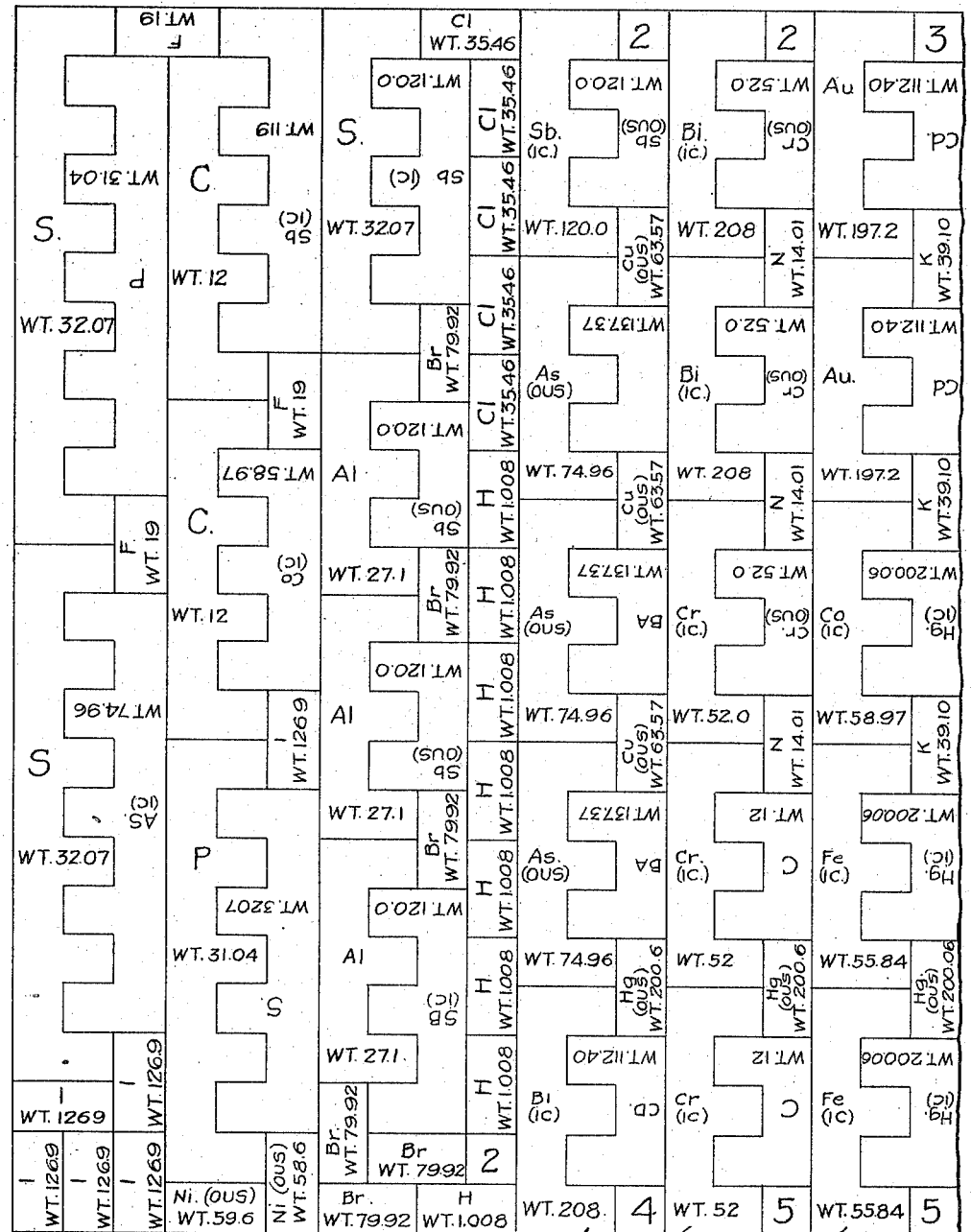
Fig. 2 is a similar view of the left hand end-portion of the said sheet or blank, the entire blank being thus illustrated in two views for convenience of illustration.

Figs. 3, 4, 5, and 6 are samples or illustrations of formulas carried out by means of the sections cut from the blank shown in Figs. 1 and 2.

As thus illustrated, the sheet or blank is preferably printed on paper or other suitable material, and the different sections are outlined closely together thereon, so that one section interlocks with another, whereby no waste space or material is left between the sections. In this way, it will be seen that some of the sections shown in outline are simply rectangular and straight strips, such as the strips or sections 1, 2, and 3 at the lower right hand corner of the sheet, which represent monovalent elements or radicals. Likewise the sections 4, 5, 6, 7, 8, 9 and 10 are simply straight strips, their right hand ends each forming a single arm, and denoting a monovalent element. On the other hand, other sections, such as the sections 11 and 12, at the lower edge of the sheet each have two separate arms, thereby denoting a divalent element. Again, as the outlining of the sections progresses toward the left, some of the sections, such as the sections 13, 14, 15, and 16 at the lower edge of the sheet, and in rows extending vertically, each have three arms extending to the right, thus each denoting or indicating a trivalent element. As shown in the drawings, the blank terminates at the left hand end thereof in sections having six arms, and it will be understood that the sheet can be as large as desired, and may contain as many sections as are necessary or desirable, and that the valency of the different sections may run from monovalence to as high a valence as is known to chemistry.

It will also be seen, in Figs. 1 and 2, that the indicia of each element or radical is printed on the different sections, so that each section has permanently printed thereon the indica of the element or radical which it represents. In the printing of the sheet, and in order to save waste between the sections, when they are cut out, the arms of some of the sections extend to the right and the arms of the other sections extend to the left. Therefore, for reasons which will hereafter more fully appear, the printing on the sections which have arms extending to the left is upside down, while the printing on the sections which have arms extending to the right is right side up. In this way, all of the sections read with their arms to the right. Some of the straight sections, representing monovalent elements, extend up and down the sheet, so that the printing of these sections is neither right side up nor upside down, but is arranged to extend vertically of the sheet.

In Figs. 3, 4, 5, and 6 some illustrations are shown of the way in which the sections are used after they are cut out from the sheet. In Fig. 3, for example, a monovalent element, represented by the section 17, is combined with a monovalent element represented by another straight section 18, each having, in effect, only a single arm. In Fig. 4, however, a divalent element, represented by the section 19, having two arms, is combined with two monovalent radicals or elements represented by the sections 20 and 21, thereby visualizing the theory of valence in carrying out the formula for this particular combination of chemical elements. In Fig. 5 a divalent element represented by the section 22, is combined with one divalent radical or element represented by the section 23, in order to carry out the formula of this particular proposition or experiment in chemistry. In Fig. 6, two trivalent elements, represented by the sections 24 and 25, are combined with three divalent radicals or elements, represented by the sections 26, 27, and 28, the sections 24 and 25 each having three arms extending to the right, and the sections 26, 27 and 28 each having two arms which extend to the right when these sections are right side up and which extend to the left when they are reversed to come opposite the arms of the trivalent sections. Thus it will be seen that the number of arms of any section represent the valence of the element or radical which it represents, and that an object lesson can easily be given the student which will tend to fix in mind the theory of valency, and the manner in which the theory works out or is practically applied in any particular case.

It will be seen that when the sections are cut out of the sheet, there will also be a few small square sections, particularly in the right hand end-portion of the sheet, such, for example, as the sections 29 and 30 in the right hand lower corner portion of the sheet, and it will be understood that these small square sections can be provided with marks or signs printed thereon, such as those ordinarily known to chemistry, so that these sections may be employed in different ways in connection with the other sections.

In using the sections, it will be seen that the first section is preferably arranged with its arms pointing to the right, and hence the desirability of printing the different sections so that they will all read with their arms extending in this direction. They can be turned upside down, however, in order to extend the grouping of the sections and the piecing together thereof to the right, in illustration of any particular formula.

What I claim as my invention is:—

1. In a valency chart, a sheet showing in outline thereon a plurality of rectangularly formed sections that fit together on the sheet and which, when cut out, represent different chemical elements or radicals, and which have means to indicate the valence of the element or radical represented by each section.

2. A valency chart as specified in claim 1, said means consisting of one or more separate arms for each section, so that the monovalent elements or radicals are represented by sections in the form of straight strips, the divalent by sections having two parallel arms, the trivalent by sections having three parallel arms, etc., whereby each section has a number of straight arms equal to the valence thereof, and with the arms of uniform size and uniformly spaced.

3. A valency chart as specified in claim 1, said outlined sections being shaped to interlock to prevent waste portions between them in cutting them apart.

4. A set of valency sections, each section having one or more separate arms to represent the valence thereof, so that the section representing monovalent elements or radicals are straight strips, while the divalent have two parallel arms, the trivalent three parallel arms, etc., with all of the arms of uniform size and uniformly spaced, so that the sections in use are placed one below the other vertically and one after the other horizontally, in these directions only.

5. A set of valency sections as specified in claim 4, each section having permanently printed thereon the indicia of the element or radical represented thereby.

6. A valency chart as specified in claim 1, each outlined section on the sheet having permanently printed thereon the indicia of the element or radical represented thereby.

7. A valency chart as specified in claim 1, each section having permanently printed thereon the indicia of the element or radical represented thereby, with some of said arms extending to the right and some to the left, and with the printed matter upside down on the sections which have arms that extend to the left, so that the sections will all read with their arms to the right when cut out of the sheet.

8. In a valency chart, a sheet showing in outline thereon a plurality of sections which, when cut out, represent different chemical elements or radicals, and which have means to indicate the valence of the element or radical represented by each section, said outlined sections being shaped to interlock to prevent waste portions between them in cutting them apart.

9. In a valency chart, a sheet showing in outline thereon a plurality of sections, which, when cut out, represent different chemical elements or radicals, and which have means to indicate the valence of the element or radical represented by each section, each section having permanently printed thereon the indicia of the element or radical represented thereby, with some of said arms extending to the right and some to the left, and with the printed matter upside down on the sections which have arms that extend to the left, so that the sections will all read with their arms to the right when cut out of the sheet.

Signed by me this 24th day of April, 1918.

WILLIAM C. COOPER.

Copies of this patent may be obtained for five cents each, by addressing the "Commissioner of Patents, Washington, D. C."